June 9, 1925.　　　　T. A. FEDERWITZ ET AL　　　　1,541,036
BOX COVERING MACHINE
Filed June 22, 1923　　10 Sheets-Sheet 3

June 9, 1925.

T. A. FEDERWITZ ET AL 1,541,036

BOX COVERING MACHINE

Filed June 22, 1923     10 Sheets-Sheet 6

INVENTORS
Theodore A. Federwitz
BY and Walter T. Bailey
Cornelius A. Ehret
their ATTORNEY.

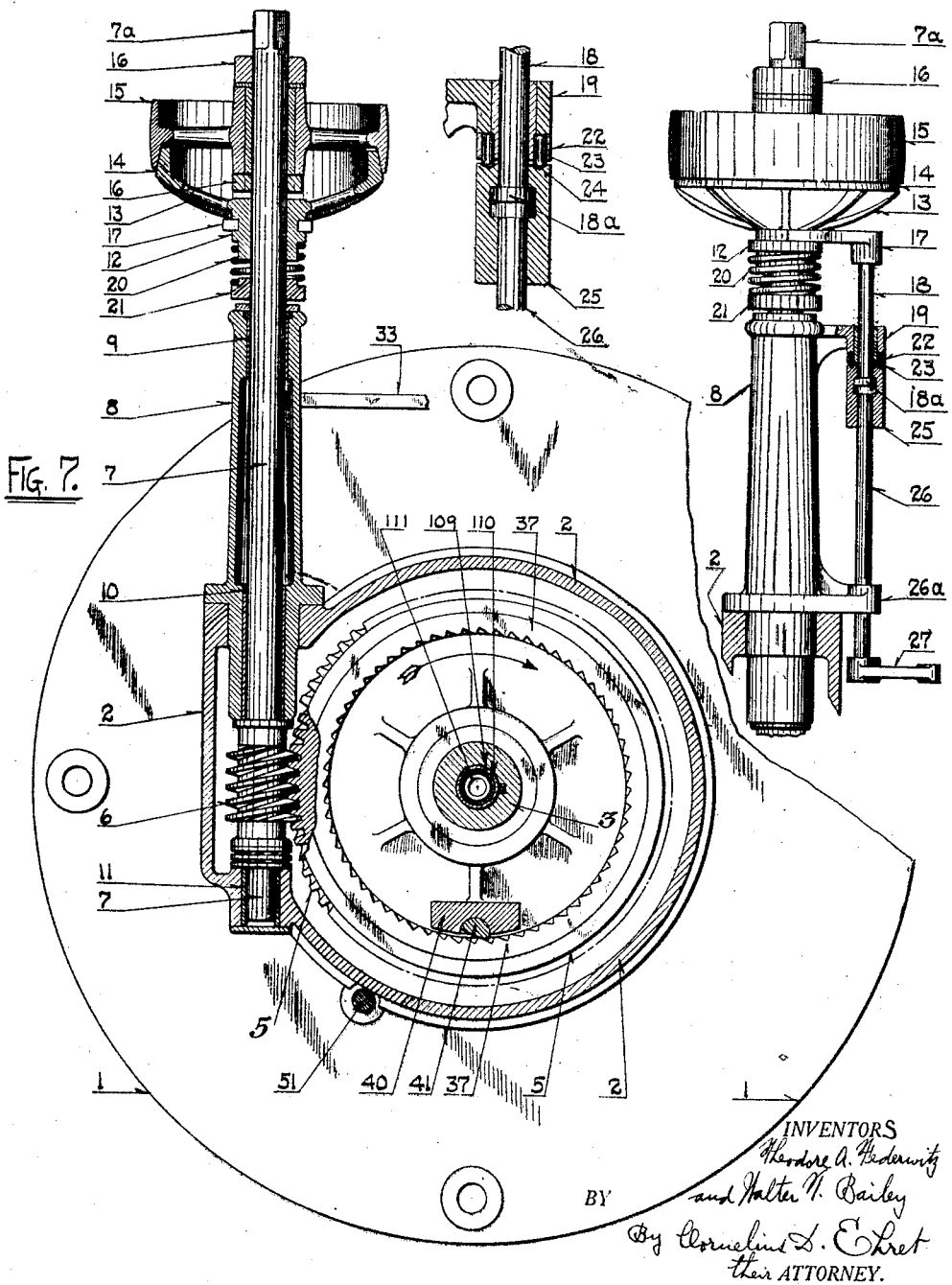

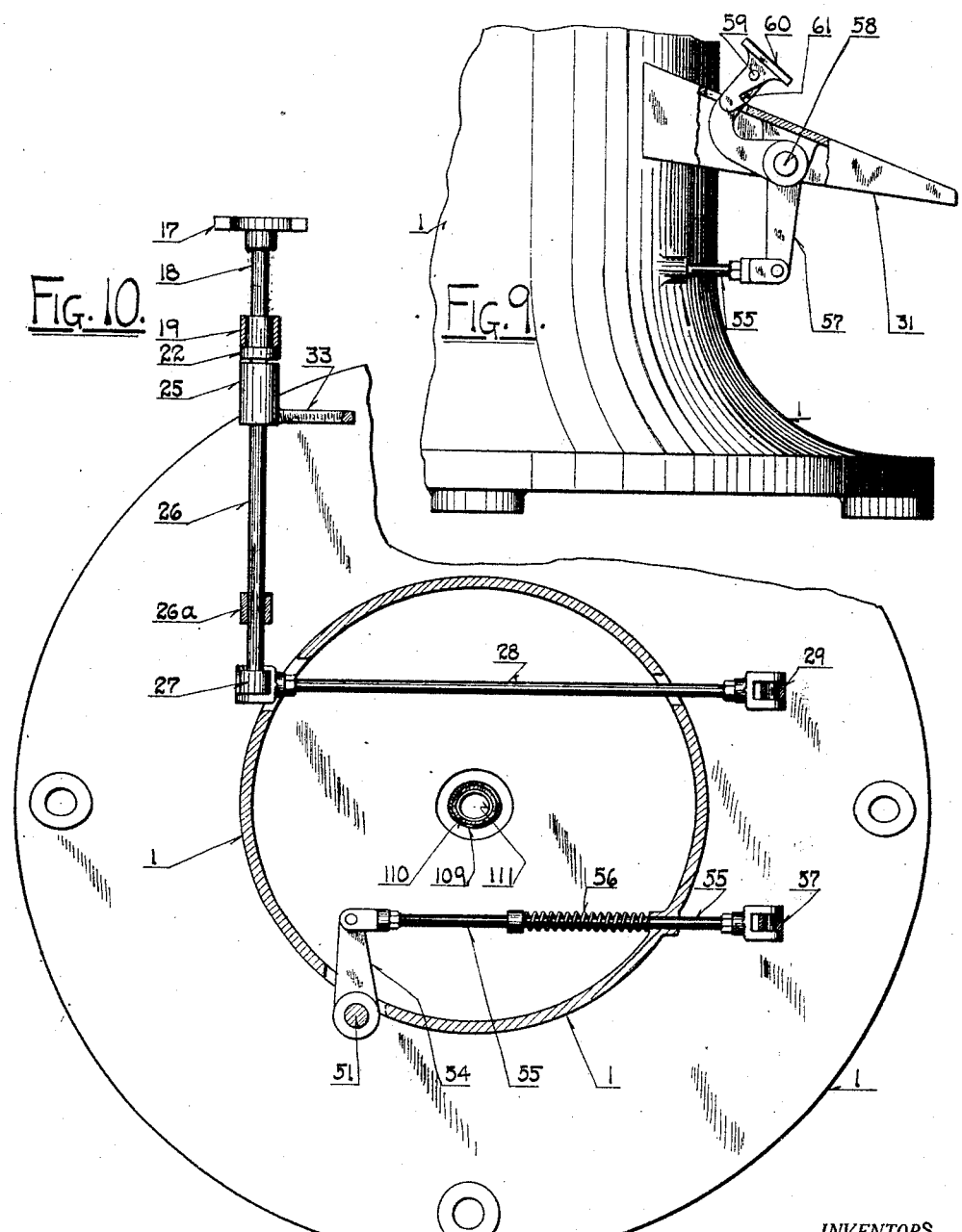

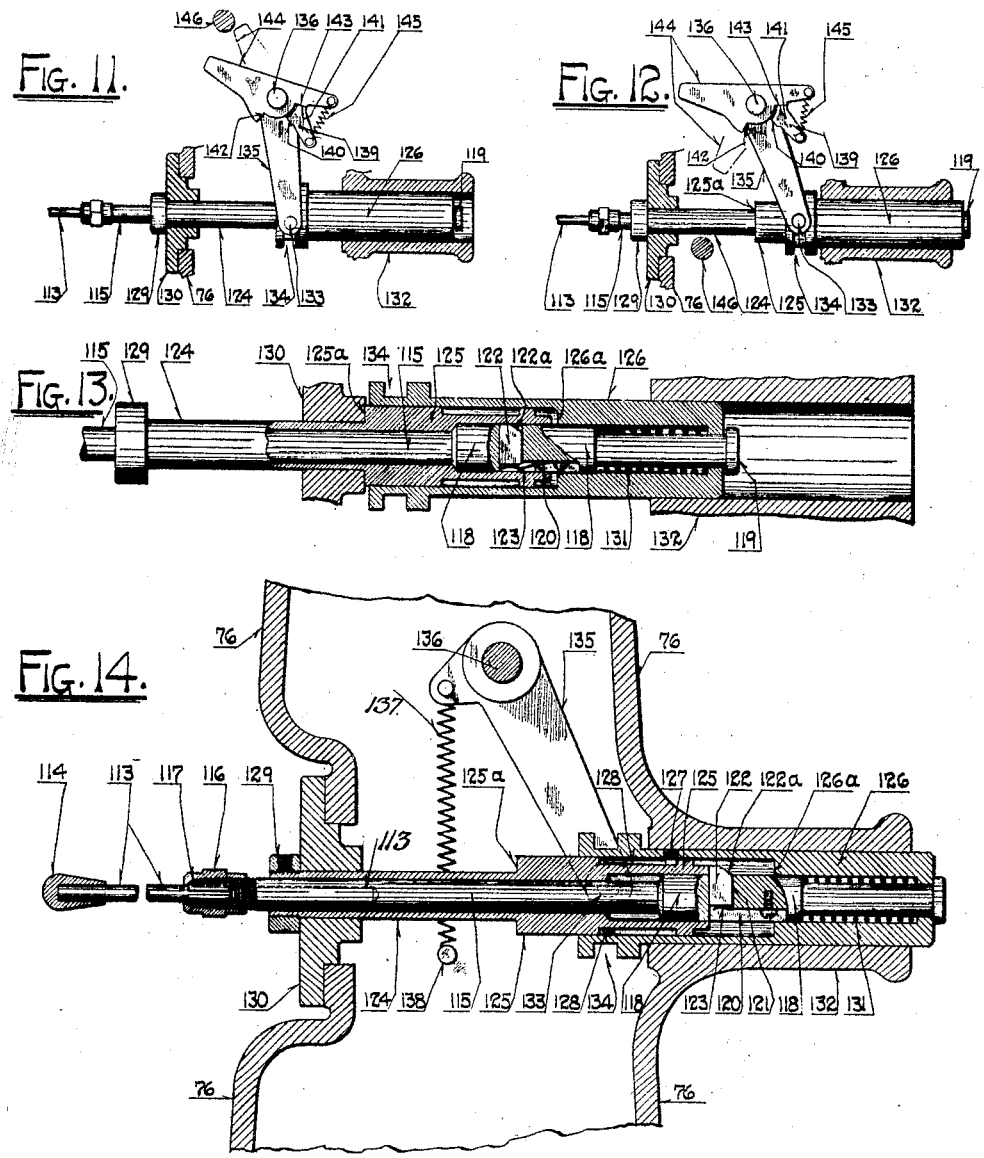

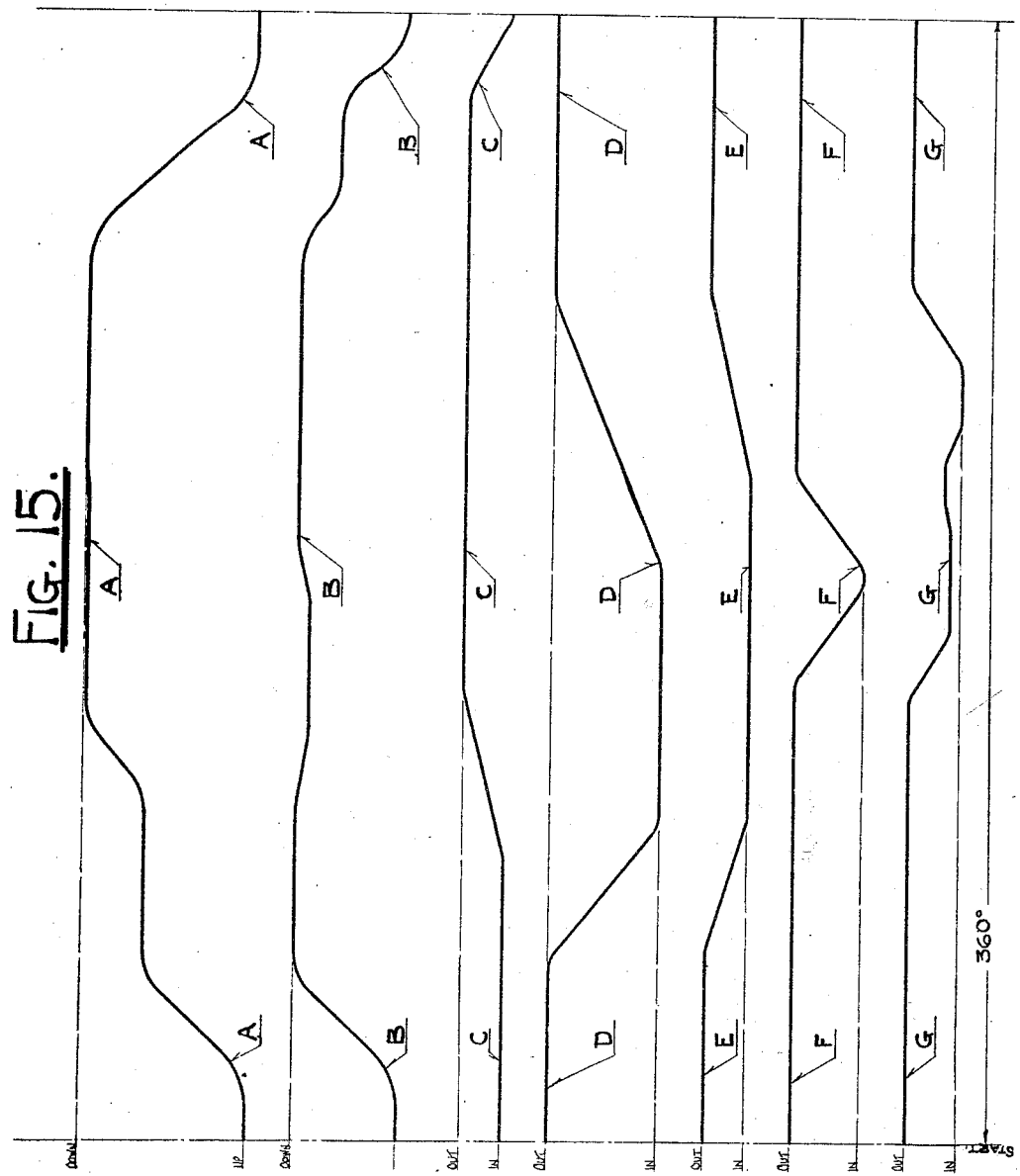

Patented June 9, 1925.

1,541,036

UNITED STATES PATENT OFFICE.

THEODORE A. FEDERWITZ AND WALTER T. BAILEY, OF PHILADELPHIA, PENNSYLVANIA, ASSIGNORS TO STOKES AND SMITH COMPANY, OF PHILADELPHIA, PENNSYLVANIA, A CORPORATION OF PENNSYLVANIA.

BOX-COVERING MACHINE.

Application filed June 22, 1923. Serial No. 647,012.

*To all whom it may concern:*

Be it known that we, THEODORE A. FEDERWITZ and WALTER T. BAILEY, citizens of the United States, residing in the city and county of Philadelphia, State of Pennsylvania, have invented certain new and useful Improvements in Box-Covering Machines, of which the following is a specification.

Our invention relates to machines for covering previously formed or stayed boxes and their covers, whether plain or provided with extension edges, by applying thereto a cover blank or wrapper, or for forming a box blank into box form and applying a cover blank serving both to hold the box blank elements in box-forming position and to cover the box.

Our invention resides in novel features of construction, combination and location of the cam and associated mechanism which control and actuate the main and auxiliary plungers, which in turn control and actuate the main and auxiliary form blocks.

Our invention resides also in combination with the aforesaid cam and its associated mechanism of a clutch intervening between the same and a driving element and operating automatically to connect and disconnect said cam and its associated mechanism with and from said driving element at predetermined intervals, preferably at the beginning and end of each box-covering cycle, said clutch preferably being of such type that its structure which effects the aforesaid connection and disconnection may be locked or restrained against operation, whereby the cam and its associated mechanism will be continuously driven by the driving element.

Further in accordance with our invention, there are provided for operating each of a plurality of slides, units or slide units adjustable upon slides or guides to different positions with respect to the work-carrying structure and each comprising cam structure for effecting in predetermined sequence movements of such tools, instrumentalities or elements, as brushes, rollers, corner lap fingers, edge turn-in fingers, pressure blocks and the like, a rotatable shaft, fixed against longitudinal movement, driving a gear comprised in and adjustable or slidable with the slide, unit or slide unit, along said shaft; and further in accordance with our invention, said shafts are driven by bevel or equivalent gears secured thereto and meshing with and driven by a common bevel or equivalent gear.

Further in accordance with our invention, the structures of the aforesaid slides, units or slide units are driven by the aforesaid driving element through the aforesaid clutch and said first mentioned cam.

Further in accordance with our invention, there intervenes between the aforesaid driving element and a driving wheel or pulley a second clutch comprising a driven member or cone frictionally engaging said wheel or pulley and provided with novel means for disengaging said driven member from the driving member or pulley.

Further in accordance with our invention, we provide novel mechanism for actuating and controlling the mechanism for ejecting or removing the covered box after completion of a cycle of the box-covering machine.

Our invention resides in the features of construction, combination and location of the character hereinafter described and claimed.

For an illustration of one of the various forms our mechanism may take, reference is to be had to the accompanying drawings, in which:

Fig. 7 is a horizontal sectional view, partly in plan, taken on the line 7—7 of Fig. 2.

Fig. 8 is a front elevational view, partly in vertical section, of part of the driving mechanism of Fig. 7.

Fig. 8ª is a sectional view, on enlarged scale, of part of the operating mechanism of one of the clutches.

Fig. 9 is a fragmentary side elevational view, partly in vertical section, of a portion of the pedestal of the machine having attached thereto foot-operated clutch-controlling mechanism.

Figure 2:
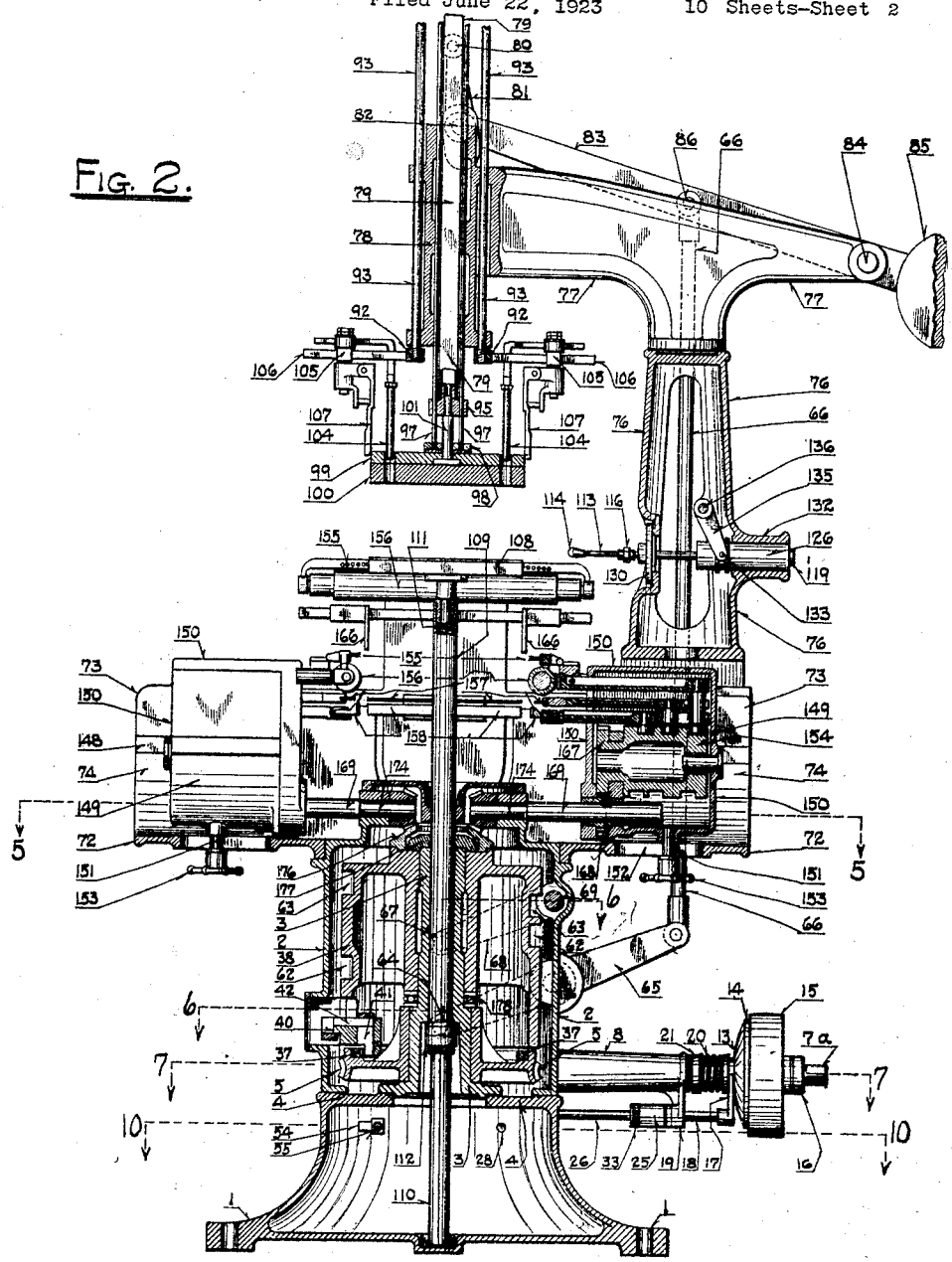
Fig. 2 is a vertical sectional view, parts in elevation, taken on the line 2—2 of Fig. 3.

Fig. 10 is a horizontal sectional view taken on the line 10—10 of Fig. 2.

Figs. 11 and 12 are front elevational views, partly in vertical section, of part of the ejector mechanism in different positions.

Figs. 13 and 14 are vertical sectional views, partly in side elevation, on larger scale, of parts of the ejector mechanism in different positions.

Fig. 15 is a development of the several cam grooves, indicating the directions and timing of the several movements controlled thereby.

Referring to the drawings, 1 is a pedestal or base, preferably hollow, supporting the casing or hollow column 2, within which is disposed the main bearing member 3 supported upon the upper end 4 of the pedestal 1. Rotating upon the bearing member 3 is the worm gear 5, driven by the worm 6, secured upon the shaft 7, squared at its outer end at 7ª for application of a wrench, crank or the like for manual operation for setting, adjusting and other purposes. The shaft 7 is disposed within the housing 8, Figs. 1, 2, 7 and 8, carried by the casing 2, the shaft 7 having bearings at 9 and 10 in the housing 8 and 11 on the member 2. Splined upon the shaft 7 for rotating it, but movable longitudinally thereof, is the clutch hub 12 carrying the spokes 13 carrying at their outer ends the driven clutch cone 14, with which engages the driving clutch member or pulley 15 adapted to be driven by a belt or any equivalent means, and rotating freely upon the shaft 7 and confined against longitudinal movement between collars 16, secured to the shaft 7. A yoke 17 is carried upon the end of the longitudinally movable rod 18 slidable in the bracket 19 carried by the shaft housing 8. A spring 20, engaging at its one end against the collar 21 secured to the shaft 7, thrusts at its other end against the hub 12, thereby normally engaging the clutch members 14 and 15, movement of the yoke 17 toward the left, Figs. 1, 2, 7 and 8, serving to disengage the driven clutch member 14 from the tool 15 in opposition to the spring 20. In the bracket 19 is disposed a bearing bushing for the shaft 18 having at its end the collar 22, carrying pins 23 engaging in recesses 24 in the end of the sleeve 25, secured upon and rotatable by the shaft 26, the shaft 18 having a head 18ª confined within the sleeve 25 and with respect to which the sleeve 25 is rotatable. Upon rotation of the shaft 26 the sleeve 25 is rotated, thereby rotating the recesses 24 with respect to the pins 23, forcing the sleeve 25 longitudinally and thereby imparting longitudinal movement to the rod 18 and yoke 17 to disengage the clutch members 14 and 15. The rod 26 has a bearing at 26ª carried by the shaft housing 8, and carries at its end the crank 27, to whose end is connected the rod 28, which extends freely through the pedestal 1 and connects at its forward end to the pedal bell crank 29 pivoted at 30, Fig. 3, upon the foot rest bracket 31, Figs. 1, 3 and 9, through which extends the second arm of the bell crank lever 29, terminating in the pedal 32, which, when actuated by the foot, disengages the clutch members 14 and 15, which remain disengaged because the pins 23 are out of the recesses 24 in the sleeve 25. Attached to the sleeve 25 is the lever 33, pivoted to the upwardly extending rod 34 pivoted at 35, Fig. 1, to the hand operated lever 36, which may rotate the sleeve 25 to cause either engagement or disengagement of the clutch members 14 and 15.

The worm gear 5 itself forms the driving member of a clutch, or has secured thereto a driving member of a clutch. Secured to the wheel 5 is the interiorly notched ratchet ring 37, Figs. 2 and 7.

Figure 6:
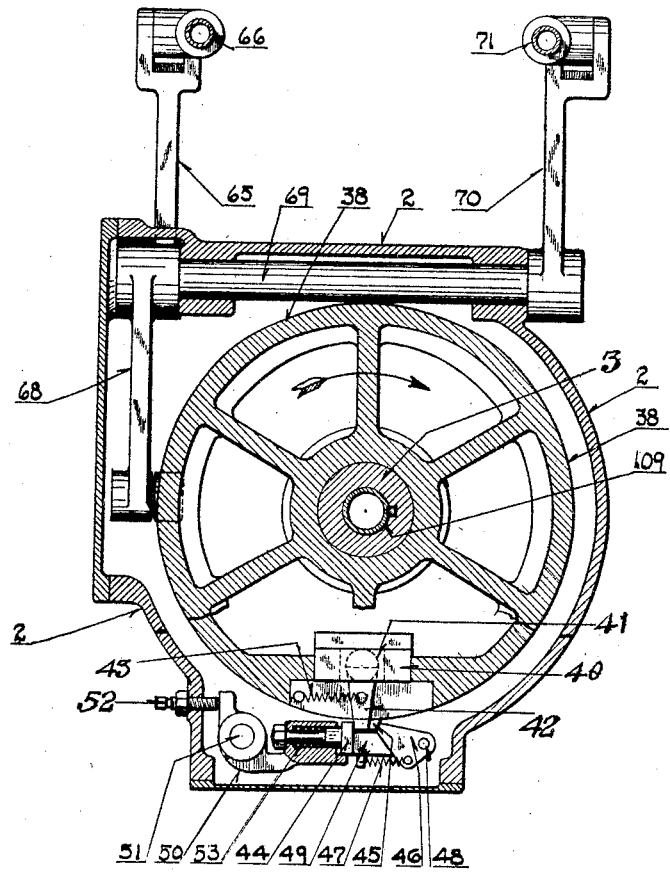
Fig. 6 is a horizontal sectional view, parts in plan, taken at different heights as indicated by the lines 6—6 of Fig. 2.

Rotatable freely upon the bearing member 3 is the main cam member or cylinder 38, whose lower end is disposed adjacent the worm gear 5. In a recess 39 in the lower end of the cam member 38 is secured the pawl unit co-acting with the teeth of the ratchet ring 37. The pawl unit comprises the pawl-supporting member 40, in which is pivoted for movement about a vertical axis the pawl 41, practically semi-cylindrical in extent at its lower end and having at its upper end the outwardly extending arm 42, to which is connected one end of a tension spring 43, whose other end is connected to the member 40, Fig. 6. As indicated in Fig. 7, the pawl 41 is in engagement with a ratchet tooth of the ratchet ring 37, in which position the cam cylinder 38 is driven by the gear 5 through the ratchet ring 37 and pawl 41. Rotation of the pawl 41 about its vertical axis, as by movement of its arm 42, will cause the pawl 41 to either disengage from or engage with the ratchet ring 37. The outer end of the arm 42, when the cam cylinder 38 is rotating in the direction of the arrow, Figs. 6 and 7, will engage the yielding stop 44, causing rotation of the pawl 41 to disengage from the ratchet ring 37, whereby the cam cylinder 38 and all parts driven therethrough and thereby will come to rest. On the member 40 is a lug 45, which engages the yielding stop 44 after the pawl 41 has been disengaged from the ratchet ring 37, preventing the cam cylinder 38 and all parts connected thereto from rotating further by momentum. When the lug 45 engages the stop 44, the latch 46, controlled by the spring 47, engages upon the rear side of the lug 45, preventing reverse movement of the cam cylinder 38 and any parts connected therewith. The latch 46 is pivoted at 48 upon the member 49 forming a unit with the stop 44, carried by and yieldingly movable with respect to the support 50, secured upon the pivotal shaft 51 and adjustable by the adjusting screw 52. The member 50 is chambered to receive the spring 53, which opposes the movement toward the left, Fig. 6, of the abutment or stop 44, thereby effecting yielding of the abutment as the cam cylinder 38 and attached parts come to rest. The cam cylinder 38 and attached parts will accordingly be unclutched from the driving gear 5 at the end of each revolution, or any other extent of movement, as may be suitable or desirable. To re-engage this clutch mechanism, to cause a further revolution of the cam cylinder 38, the shaft 51 is rotated by the crank 54, Fig. 10, which is in turn actuated by the rod 55, in opposition to spring 56. The rod 55 is pivoted to one end of the second pedal bell crank 57, pivoted to the foot rest 31 at 58, Fig. 9, the second arm of the bell crank 57 having pivoted thereto at 59 the second pedal 60 carrying a latch 61, whereby the pedal may be locked to the foot rest 31 in depressed position, in which position the member 50, Fig. 6, has been rotated in clockwise direction about the axis of shaft 51 to withdraw the stop 44 from the path of the pawl arm 42 and lug 45, whereby the cam cylinder 38 remains clutched, by engagement of pawl 41 with ratchet ring 37, to the driving element or structure comprising the worm gear 5, in which case the cam cylinder 38 and attached parts continue to rotate and operate without periodic stoppage or interruption.

The cam cylinder 38 has the two cam channels or grooves 62 and 63 for controlling, respectively, the main and auxiliary plungers about to be described. Engaging in the cam groove 62 is the cam follower or roller 64, carried upon the end of a lever 65, to whose outer end is pivoted the vertically extending rod 66. Engaging in the second cam slot 63 is the cam follower or roller 67 carried upon the end of the lever 68, secured upon the shaft 69, having bearings in the member 2 and having secured at its other end the crank 70, to which is pivoted the upwardly extending rod 71.

Carried upon the housing or casing 2 is the surbase 72, carrying at its top the four table elements 73 joined by the U-shaped members 74, bridging one of which, and secured to the adjacent table elements 73, is the base 75 of the hollow vertically extending column 76, upon whose upper end is secured the bracket 77, at whose inner end is provided a head 78, within which is provided bearings for vertical movement thereon of the main plunger 79 carrying the pin 80, upon which is pivoted the link 81 having at its lower end a slot in which is adjustable the pivot pin 82 carried at the forward end of the lever 83, pivoted to the bracket 77 at 84 and carrying at its rear end the counterweight 85, and pivotally attached to the vertically extending rod 66 at 86.

The vertically extending rod 71 is pivoted at its upper end at 87 to the lever 88, pivoted to the bracket 77 at 84 and pivoted at its forward end at 89 to the connecting rod 90, pivoted at its lower end at 91 to the yoke-shaped auxiliary plunger 92, to which is secured the vertical guide rods 93 guided and movable upon the head 78, joined at their upper ends by the yoke 94.

Figure 1:
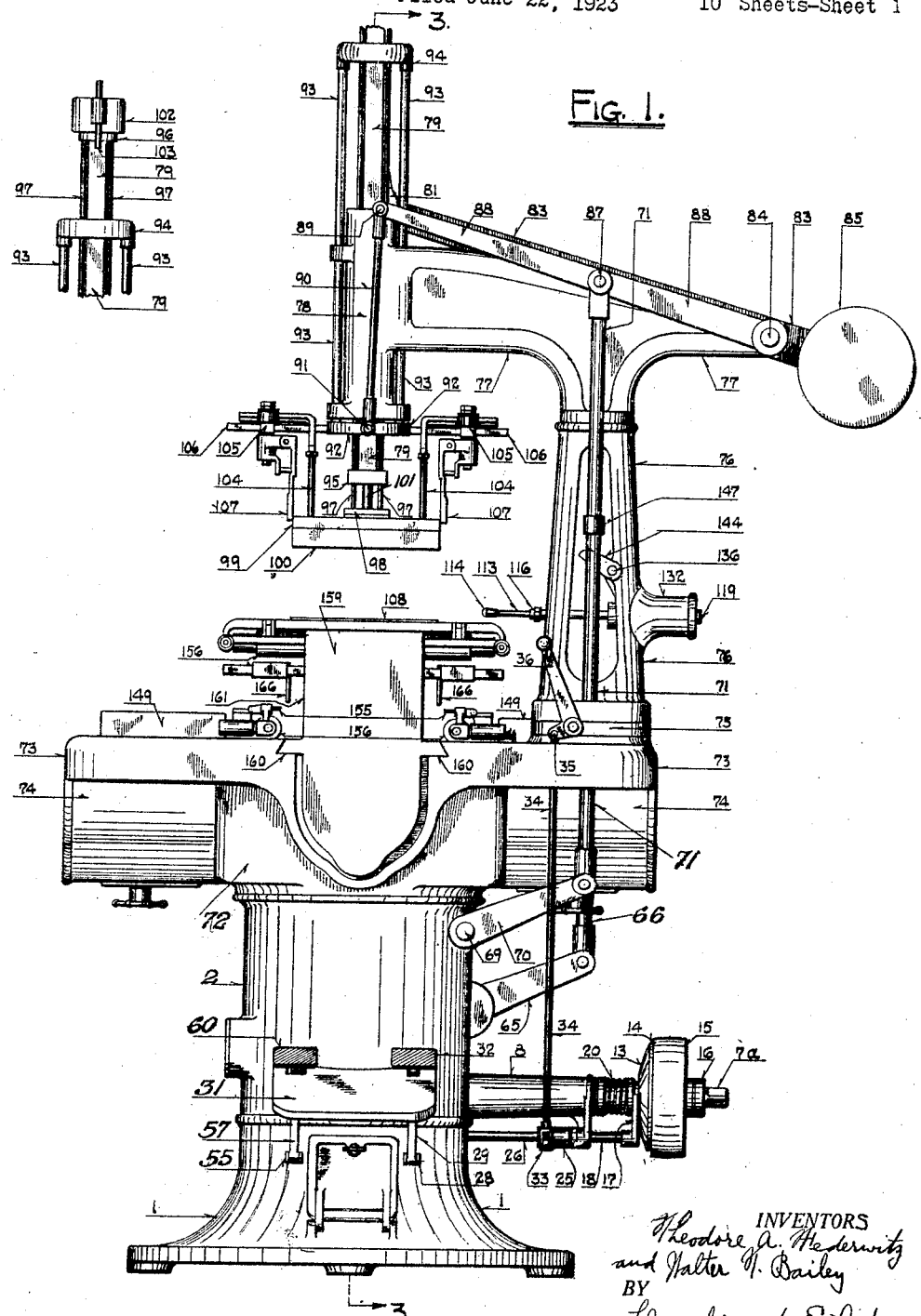
Fig. 1 is a front elevation of our machine.

The main plunger 79 carried at its lower end the plug 95, and at its upper end a similar plug 96, Fig. 1, through which, and the lower plug 95, are vertically guided and movable the rods 97, to which are secured at their lower ends, Figs. 1 and 2, the block 98 secured to the auxiliary form block 99 overlying and co-acting with the main form block 100, which latter is secured upon the spur member 101 detachably secured to the member 95 movable with the main plunger 79. To the upper ends of the rods 97 is secured the head 102, which carries the adjustable stop pin 103 adapted to engage upon the upper side of the yoke 94.

The main and auxiliary form blocks 99 and 100 are provided with registering apertures through which are adapted to pass the stripper rods 104 carried by the blocks 105 adjustable longitudinally of the members 106 projecting laterally from the auxiliary plunger yoke 92. Holding fingers 107, carried by the blocks 105, are utilized for holding the unstayed work or boxes, as understood in the art.

Disposed beneath the form blocks 99 and 100 is the platen 108, carried by the tube or lower plunger 109 telescoping over the spring tube 110 supported at its lower end upon the pedestal 1 and housing a spring 111, Fig. 2, opposing downward movement of the platen 108 and restoring it to normal position indicated in Fig. 2, the lower plunger 109 having at its lower end the adjusting nuts 112 serving as a stop to engage with the main bearing member 3 to limit upward movement of platen 108.

Disposed to one side of the platen 108 is the ejector rod 113 carrying at its end the buffer 114, Figs. 1, 2, 3 and 11 to 14 inclusive. The rod 113 extends into the main ejector plunger 115, and is adjustably secured thereto by the nut 116 threaded upon the plunger 115 and forcing into engagement with the rod 113 the yielding jaws 117. The plunger 115 has a portion 118 of enlarged diameter, and at its remote end the head 119. In the portion 118 is formed a longitudinally extending groove 120 and the transversely extending slot 121, in which is disposed the movable pawl or latch 122, moved upwardly by the spring 123 secured to the member 115 in the groove 120. The member 115 is movable longitudinally within the inner barrel or plunger 124 having the enlargement 125 movable longitudinally within the second barrel or plunger 126, within which is guided also the portion 118 of the member 115. A screw 127, carried by the barrel 126, engages in the circumferential groove or channel 128 in the member 125, limiting relative movement of the members 125 and 126, the member 125 being limited as to its movement toward the right by the stop collar 129, which engages the bearing plate 130 carried by the column 76. Within the barrel 126 is disposed the helical spring 131, thrusting at its one end against the end of the barrel 126 and at its other end against the portion 118 of the plunger 115. The barrel 126 reciprocates in a bearing in the boss 132, and is actuated by the pin 133 loosely engaging in the circumferential groove 134 in the member 126 and carried by the lever arm 135 secured upon the shaft 136, having bearings carried by the column 76. Secured to an arm on the lever 135 is a tension spring 137, Fig. 14, secured at its other end at 138 to a pin carried by the column 76, the tension of the spring tending to rotate the lever 135 in counter-clockwise direction and thereby move the barrel 126 toward the right. Secured upon the shaft 136, Figs. 11 and 12, is the lever arm 139 having on opposite sides the abutments 140 and 141, co-acting, respectively, with the abutments 142 and 143 on the lever 144, loosely pivoted upon the shaft 136 and connected by tension spring 145 to the lever arm 139. The pin 146, carried by the collar 147, Fig. 1, secured upon the rod 71, co-acts with the lever 144, causing counter-clockwise and clockwise movements of the lever 144 by downward and upward movements, respectively, of the rod 71.

At the beginning of the cycle of operation of the ejector rod 113, that is, immediately after the rod 113 has been moved toward the left in effecting ejectment of a box from the machine, the parts are in the position indicated in Fig. 13. However, the spring 137 immediately returns the barrel 126 and the plunger 115 toward the right to the position indicated in Fig. 11, the plunger 115 and barrels 125 and 126 and the latch 122 being still in the positions relatively to each other indicated in Fig. 13, with the collar 129, however, arrested by engagement with the bearing block 130.

Thereafter, the pin 146 moves downwardly, engaging upon the upper side of the lever 144, moving it in opposition to the spring 145 in counter-clockwise direction until the abutment 142 engages the abutment 140 of the lever 139, thereby positively rotating said lever 139 in counter-clockwise direction and causing similar movement of the lever arm 135 and movement of the barrel 126 toward the right, and therefore by engagement with the head 119 moving the plunger 115 and ejector rod 113 toward the right to the position indicated in Fig. 14, the latch 122 having been carried out of the chamber in member 125 and moved to the position indicated in Fig. 14 by the spring 123. The pin 146, in continuing in its downward movement, passes off of the left end of the lever 144 and the spring 145 restores the member 144 to the position indicated in Fig. 12 with its top 143 in engagement with the stop 141. Upon the up stroke of the pin 146 it engages the under side of the lever 144, positively moving it in clockwise direction and positively actuating the lever 139 in like direction by engagement of the stop 143 with the stop 141. This causes clockwise rotation of the lever arm 135 and corresponding movement toward the left of the barrel 126, and through the compression exerted thereby upon the spring 131 moving the plunger 115 toward the left, the latter through the latch 122 positively actuating the barrel 125 toward the left, the barrel 125 being confined, however, between the latch 122 and the screw 127 carried by the barrel 126. This movement continues until the shoulder 125ª upon the plunger 125 engages the right face of the member 130, thereby arresting the barrel 125 and the plunger 115, which is prevented from moving further to the left by the latch 122. However, the barrel 126 continues in its movement to the left, thereby further compressing the spring 131 to substantially greater extent until the shoulder 126ª on the member 126 engages the inclined surface 122ª of the latch 122, forcing it inwardly in opposition to the spring 123 until the outer edge of the latch 122 is in position to pass into the bore of the member 125, whereupon the plunger 115 is in effect tripped or released and the spring 131 moves the plunger 115, rod 113 and buffer 114 quickly toward the left, the member 114 delivering a blow to the completed box and ejecting it from the machine. Shortly after the plunger 115 has been tripped as aforesaid, the pin 146 in its continuing upward movement passes by the end of the lever 144 to the position indicated in Fig. 11, the spring 137, as previously stated, immediately returning the parts to the position indicated in Fig. 11.

Adjustable toward and from the work or platen 108 upon guide ways or slides 148 upon the surbase 72 or table elements 73 are the slides, units or slide units 149, of a character disclosed in Nitsch and Federwitz application Serial No. 638,116, filed May 10, 1923. The units 149 are disposed within the trough-shaped members 74 and each comprising a housing 150 carrying in its lower wall a stem 151 projecting through a slot 152 in the subbase 72 and having threaded thereon the hand-operated nut 153 for clamping the unit 149 in position to which adjusted. Rotatable within the housing 150 is the cam barrel or cylinder 154 having three cam grooves in which engage cam followers, one of which controls the forward and return movements of the brush elements 155 and roller 156, another of which controls forward and return movements of the top edge turn-in fingers 157, and a third of which controls the forward and return movements of the pressure blocks 158.

Disposed for adjustment in directions at right angles to the adjustment of the units 149 are the units 159, disposed upon the guides 160. Each unit comprises a housing 161, within which are disposed the two cam cylinders or barrels 162 and 163, which latter is provided with a gear 164 meshing with and driving the gear 165 upon the cam barrel 162, which latter is provided with two grooves in which engage cam followers, one of which serves to control forward and return movement of the brush unit elements 155 and roller 156 and the other of which controls the forward and return movements of the end turn-in fingers 166. The cam cylinder 163 is provided with two cam slots in which engage followers, one of which engages the forward and return movements of the edge turn-in fingers 157 and the other of which controls the forward and return movements of the pressure blocks 158. Upon each of the cam barrels 154 of units 149 is a gear 167, Fig. 2, driven by a gear 168 disposed within the housing 150 upon and driven by the shaft 169, longitudinally of which the unit 149 and gear 168 are adjustable. The shaft 169 carries the splined key 170 engaging in the gear 168 to drive it, but permitting adjustment of the gear along the shaft and key.

Figure 3:
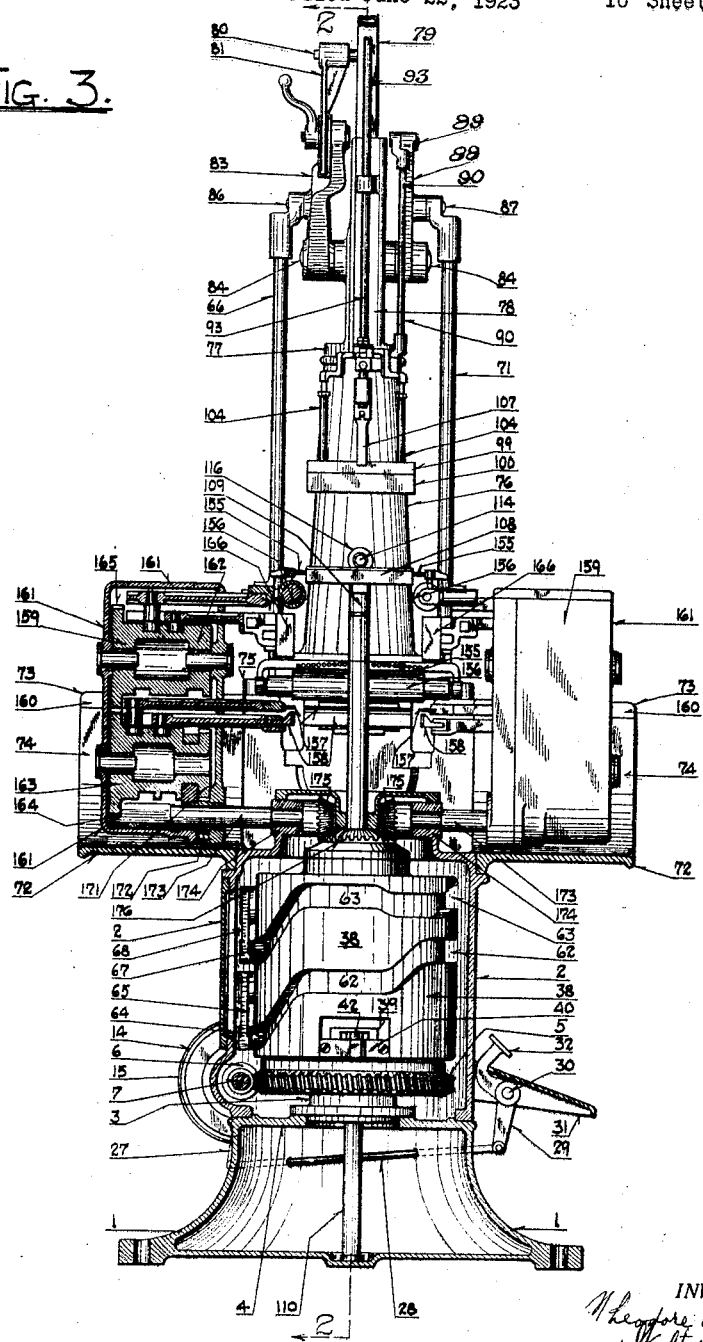
Fig. 3 is a vertical sectional view, parts in elevation, taken on the line 3—3 of Fig. 1.
Figure 4:
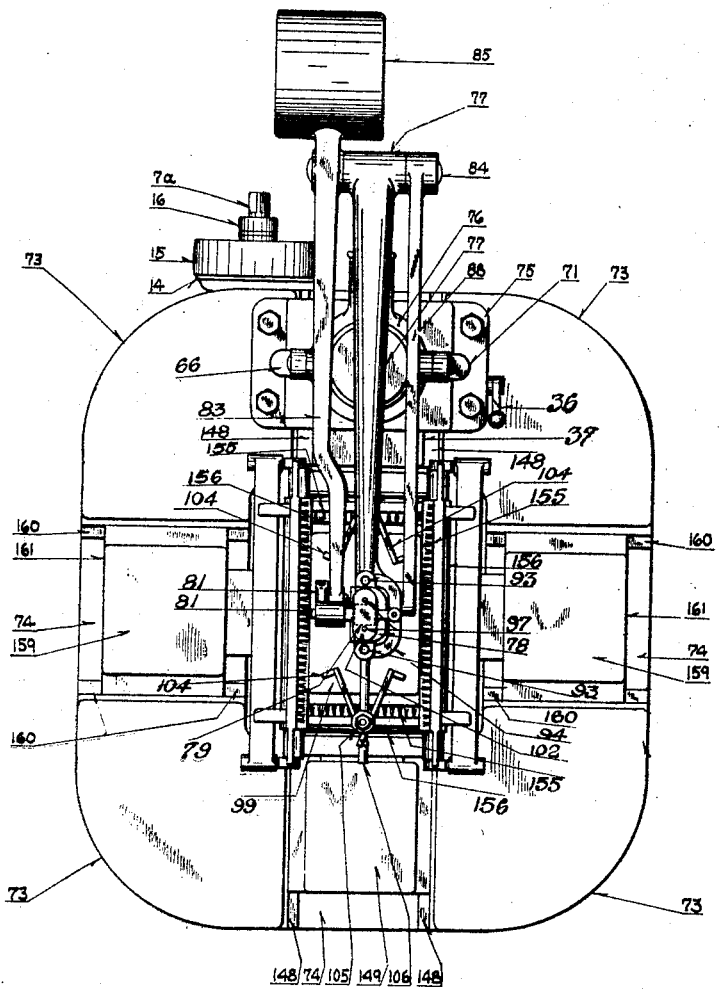
Fig. 4 is a top plan view of the machine shown in Figs. 1, 2 and 3.
Figure 5:
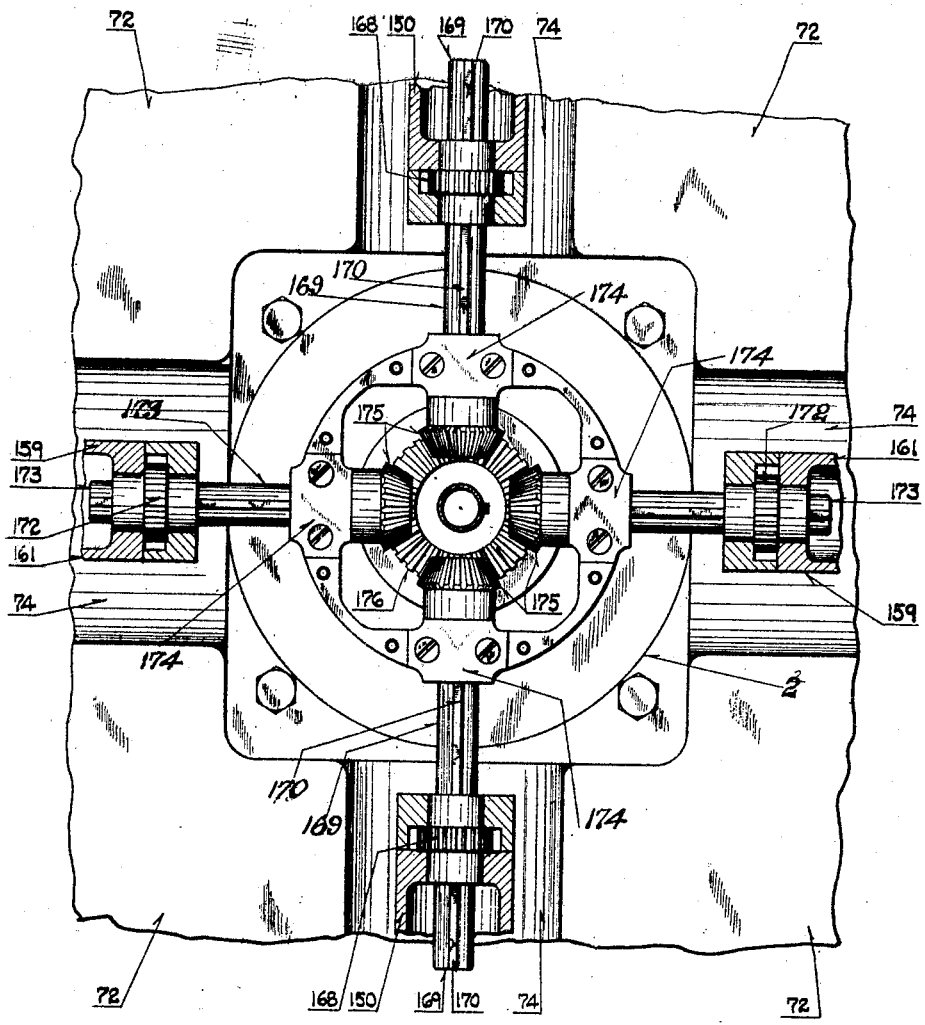
Fig. 5 is a horizontal sectional view, parts in plan, taken on the line 5—5 of Fig. 2.

Each of the cam cylinders 163 of the slide units 159 carries or is driven by a gear 171, which meshes with and is driven by the gear 172, Figs. 3 and 5, the gear 172 being splined upon the shaft 173, whereby the unit 159 may be adjusted to any position longitudinally of the shaft 173 and yet the cam barrels thereof will be driven by said shaft. The four shafts 169 and 173 having bearings at 174, carried by the housing or casing 2, and have secured upon their inner ends bevel gears 175, all meshing with and driven by the bevel gear 176 carried by and secured to the main cam cylinder 38, which is confined against upward movement by the collar 177 secured on the upper end of the main bearing 3, and having at its lower end the ball bearing 178, Fig. 2. The gear ratios are such that the cam cylinders 154 of the slide units 149 and the cam cylinders 162 and 163 of the slide units 159 rotate at a speed equal to the speed of revolution of the main cam cylinder 38; that is to say, the cam cylinders of the units 149 and 159 make one revolution for each revolution of the main cam cylinder 38.

Referring to Fig. 15, the lines A and B are, respectively, developments of the cam slots 62, 63 of the main cam 38, these lines A and B indicating, from left toward the right, the extents of movements and timing thereof of the cam followers engaging in the slots 62 and 63, respectively, and therefore indicating in a general way the characteristic movements of the main and auxiliary form blocks 100 and 99, and associated parts. The line C indicates the extents of movements and timing of the upper brushes 155 and upper rollers 156 actuated by the cam mechanism of the slide units 159; the line D represents the movements and timing of the end turn-in fingers 166 as effected and controlled by the units 159. The line E indicates the movements and timing of the lower brushes 155 and lower rollers 156 as actuated and controlled by the units 149. The line F indicated the movements and timing of the top edge turn-in fingers 157 as effected and controlled by units 149 and 159. The line G represents the movements and their timing of the pressure blocks 158 as actuated and controlled by the units 149 and 159.

The operation is as follows:

While the clutch member or pulley 15 is driven by belt or otherwise, the shaft 7 is continuously rotated, unless the movable clutch member 14 is withdrawn from the driving clutch member 15 by depression of the foot treadle 32 or by actuation of the hand lever 37. The continuously rotating shaft 7 continuously rotates the worm gear 5 through the medium of the worm 6 and, with the pawl 41 in engagement with the ratchet ring 37, causes continuous rotation of the main cam 38, gear 176 and through the latter the cam cylinders or barrels of the units 149 and 159, if the foot treadle 60 is depressed or locked in depressed position. If, however, the treadle 60 is not depressed, the self-disengaging clutch, comprising the members 41 and ratchet ring 37, effects but a single revolution of the cam cylinder 38 and the cam cylinders of the units 149 and 159, these cams coming to rest automatically at the end of a revolution, but are again set into motion by depressing the foot treadle 60.

Assuming a box (or a box cover) to have been previously formed, that is, assuming that the apparatus is to perform no operation regarding the formation or staying of the box itself, the box is placed in proper register with and upon the cover or wrapper blank, having applied thereto on one side thereof an adhesive, as glue or equivalent, and the box with the now adhering wrapper or cover blank is placed upon the form block structure comprising the auxiliary and main form blocks 99 and 100 when they are in their uppermost position, corresponding with rest position of the cam 38, or the box and the adhering wrapper are placed upon the form block structure when it is in its uppermost position if the cam 38 is continuously rotating, as when the treadle 60 is pressed or about to be depressed. As the cam 38 rotates, both rods 66 and 71 descend, causing descent in unison with each other of the auxiliary and main plungers, and therefore of the auxiliary and main form blocks 99 and 100 which with the applied box and wrapper continue their descent, the box and wrapper coming into engagement with the platen 108, which then recedes, in opposition to spring 111, throughout the further descent of the block 100. After the box and wrapper have engaged with the platen 108 and the latter recedes downwardly therewith, the side flaps of the wrapper or cover blank come into engagement with the brushes 155, and immediately thereafter with the rollers 156, which have theretofore been advanced inwardly by the cams 162 of the units 159, the brushes and rollers forcing the side flaps of the blank upwardly into engagement with the sides of the box, to which they adhere. The box and adhering cover blank continue downwardly until the bottom of the box is just above the lower brushes 155 of the units 149, or to a position opposite the end turn-in fingers 166, where the form blocks 99, 100 and the box come to rest. The end turn-in fingers are advanced after the box attains this position by the cam cylinders 162 of the units 159, the inward or forward movement of the fingers 166 folding the ends of the side flaps of the wrapper blank into adhering relation with the ends of the box. The cam 38 then causes resumption of descent of the form blocks 99, 100 and the box, past the lower brushes 155 and lower rollers 156, which have been advanced by the cams 154 of the units 149, the brushes and rollers folding upwardly and applying the end flaps of the wrapper or cover blank into adhering relation with the ends of the box over the previously inturned end portions of the side flaps of the wrapper blank. At this stage the end and side flaps of the wrapper blank project above the top edge of the box; and the auxiliary plunger 92 at this position has reached its lowermost travel and comes to rest, and with it the yoke 94. After the box passes to slight extent the lower rollers 156, the cam 38 effects slight return or upward movement of the auxiliary plunger 92, bringing the yoke 94 to rest at a predetermined position, in which it is soon thereafter engaged by the descending pin 103, thereby causing the auxiliary form block 99 to come to rest in its descent, and the main form block 100 separating therefrom and descending further to a position bringing the top edge of the box just below the turn-in fingers 157 of the four units, at which position the form block 100 and the box come to rest, as determined by the cam 38. The cams 154 of the units 149 and the cams 163 of the units 159 now advance the top turn-in fingers 157 and the pressure blocks 158, the pressure blocks applying slight pressure to the sides and ends of the box, and the fingers 157 passing across the four top edges of the box in the now intervening space between the form blocks 99 and 100, carrying the above projection portions of the side and end flaps of the wrapper to horizontal position. With the block 100 and the box still at rest, the cam 38 now again effects descent of the auxiliary plunger 92 to its lowermost position, allowing the form block 99 to descend into engagement upon the upper sides of the turn-in fingers 157. The descent of the yoke 94 at this point is to such a position that there will be clearance between it and the pin 103 in the subsequent travel of the form blocks 99 and 100. The fingers 157 are then withdrawn, allowing the auxiliary form block 99 to drop further, and in so doing fold the now horizontally bent projection of the side and end flaps of the wrapper downwardly into position adjacent and parallel with the vertical inner faces of the sides and ends of the box, the block 99 coming to rest when it reaches the now stationary block 100. The pressure blocks 158 are now withdrawn slightly, and the blocks 99 and 100 now descend slightly while in contact with each other to a position bringing the upper portions of the sides and the ends of the box to rest opposite the pressure blocks 158, which are now advanced and apply greater pressure to the sides and ends of the box, against the sides and ends of the form blocks 99 and 100 effecting adhesion of the inside portions of the end and side flaps of the wrapper against the ends and sides of the box. The pressure blocks are now withdrawn, and the cam 38 effects return upward movement of the auxiliary plunger 92, the blocks 99, 100 and the now finished box, the platen following to a point determined by the stop nuts 112, whereupon the stripper members 104, which have been brought to rest at this position, remove the box from the blocks 99 and 100 as they proceed upwardly, the members 104 then continuing their upward movement. The finished box now rests free upon the platen 108, and the continuing rise of the rod 71 under control of the cam 38 causes the pin 146 to operate the ejector plunger 113, as hereinbefore described, to eject the box from the platen into a chute or on to a conveyer. As or immediately after the box is ejected, the pawl 41 is disengaged from the ratchet ring 37, if the foot treadle 60 is not depressed, and the cam 38 and all parts actuated thereby or therethrough and controlled thereby come to rest at the end of a box-covering cycle.

Apparatus of the character described may be utilized also for simultaneously forming a box from a box blank and applying the wrapper or cover. A box blank, comprising a body portion with side and end flaps, may be placed in register with the cover blank, coated with adhesive, and the sides and ends of the box may be folded upwardly to their final and vertical positions, the application of the wrapper or cover serving to stay them and hold the box blank in box formation.

As well understood in this art, when the box or box cover is of that type having an extension edge, there may be used, in lieu of each of the simple or plain rollers 156 as hereinbefore described, that type of roller having a recess of such form and in such position as to apply the wrapper or cover upon the extension edge of the box; and the spreader brushes 155 are in such case omitted.

What we claim is:

1. In a box-covering machine, the combination with a support, of a unit adjustable to different positions thereon, said unit comprising cam structure, a tool controlled thereby, and a gear for driving said cam structure, and a driving shaft for said unit along which said gear is adjustable by adjustment of said unit upon said support.

2. In a box-covering machine, the combination with a support, of a plurality of units adjustable to different positions thereon, each unit comprising cam structure, a tool controlled thereby, and a gear for driving said cam structure, a driving shaft for each unit along which said gear is adjustable by adjustment of the unit upon said support, and a common driving member for said shafts.

3. In a box-covering machine, the combination with a support, of a plurality of units adjustable to different positions thereon, each unit comprising cam structure, a tool controlled thereby, and a gear for driving said cam structure, a driving shaft for each unit along which said gear is adjustable by adjustment of the unit upon said support, a bevel gear, and a bevel gear on each of said shafts meshing with said bevel gear.

4. In a box-covering machine, the combination with a support, of a plurality of units adjustable to different positions thereon, each unit comprising cam structure, a tool controlled thereby, and a gear for driving said cam structure, a driving shaft for each unit along which said gear is adjustable by adjustment of the unit upon said support, a common driving member for said shafts, a cam through which said member is driven, and form block structure controlled by said cam.

5. In a box-covering machine, the combination with a support, of a plurality of units adjustable to different positions thereon, each unit comprising cam structure, a tool controlled thereby, and a gear for driving said cam structure, a driving shaft for each unit along which said gear is adjustable by adjustment of the unit upon said support, a bevel gear, a bevel gear on each of said shafts meshing with said bevel gear, a cam through which said first named bevel gear is driven, and form block structure controlled by said cam.

6. In a box-covering machine, the combination with a wrapper-operating tool, of a cam member through which said tool is operated, and form block structure controlled by said cam member.

7. In a box-covering machine, a plurality of units, each comprising a wrapper-operating tool and means for operating the same, a cam member through which said operating means are actuated, and form block structure controlled by said cam member.

8. In a box-covering machine, the combination with a rotatable cam member, of form block structure controlled thereby, a platen, and a support therefor movable in the axis of rotation of said cam member.

9. In a box-covering machine, the combination with vertically movable form block structure, of a cam member disposed beneath said form block structure and rotatable about a vertical axis for controlling said form block structure, a platen disposed between said cam member and said form block structure, and a support for said platen movable in the axis of rotation of said cam member.

10. In a box-covering machine, the combination with form block structure, of a bearing member, a cam member rotatable about a vertical axis upon said bearing member and controlling said form block structure, a platen, and means supporting said platen movable axially of said cam member through said bearing member.

11. In a box-covering machine, a plurality of units, each comprising a wrapper-operating tool and means for actuating said tool, a gear common to said units for driving the tool-operating means thereof, a platen, and means supporting said platen movable through and axially of said gear.

12. In a box-covering machine, the combination with form block structure, of a bearing member, a cam member rotatable about a vertical axis upon said bearing member and controlling said form block structure, a platen, a plurality of units, each comprising a wrapper-operating tool and means for operating said tool, a gear secured upon said cam member and common to said units for driving the tool-operating means of said units, a platen, and means supporting said platen movable axially of said gear and cam member through said bearing member.

13. In a box-covering machine, the combination with a hollow base structure, of a cam member disposed therein and rotatable about a vertical axis, a surbase, a plurality of units adjustable on said surbase and each comprising a wrapper-operating tool and means for actuating the same, form block structure controlled by said cam member, and a clutch in said base structure whose driving and driven elements rotate co-axially with said cam member for driving said cam member and said tool-operating means.

14. In a box-covering machine, the combination with a hollow base structure, of a cam member disposed therein and rotatable about a vertical axis, a surbase, a plurality of units adjustable on said surbase and each comprising a wrapper-operating tool and means for actuating the same, form block structure controlled by said cam member, and a self-disengaging clutch in said base structure whose driving and driven elements rotate co-axially with said cam member for driving said cam member and said tool-operating means.

15. In a box-covering machine, the combination with a hollow base structure, of a cam member disposed therein and rotatable about a vertical axis, a surbase, a plurality of units adjustable on said surbase and each comprising a wrapper-operating tool and means for actuating the same, form block structure controlled by said cam member, and a clutch in said base structure whose driving and driven elements rotate co-axially with said cam member for driving said cam member and through said cam member driving said tool-operating means.

16. In a box-covering machine, the combination with form block structure, of a rotatable cam member for controlling said structure, a worm gear co-axial with said cam member, a worm driving said gear, self-disengaging clutch structure for operatively coupling said gear and said cam member comprising a notched ring secured to one of them and a co-acting pawl carried by the other, and means for disengaging said pawl from said ring and for bringing said cam member to rest at a predetermined position after predetermined rotative movement.

17. In a box-covering machine, the combination with form block structure, of a rotatable cam member for controlling said structure, a worm gear co-axial with said cam member, a worm driving said gear, self-disengaging clutch structure for operatively coupling said gear and said cam member comprising a notched ring secured to one of them and a co-acting pawl carried by the other, means for disengaging said pawl from said ring and for bringing said cam member to rest at a predetermined position after predetermined rotative movement, a driving member, and a second disengageable clutch intervening between said driving member and said worm.

18. In a box-covering machine, the combination with form block structure, of a rotatable cam member for controlling said structure, a disengageable clutch through which said cam member is driven, and a second disengageable clutch through which the driving member of said first named clutch is driven.

19. In a box-covering machine, the combination with a plurality of units each comprising a wrapper-operating tool and means for operating the same, of a self-disengaging clutch through which said operating means are driven, and a second disengageable clutch through which the driving member of said first named clutch is driven.

20. In a box-covering machine, the combination with a plurality of units each comprising a wrapper-operating tool and means for operating the same, of form block structure, a rotatable cam member controlling said structure, a self-disengaging clutch through which said operating means and said cam member are driven, and a second disengageable clutch through which the driving member of said first named clutch is driven.

21. In a box-covering machine, the combination with a plurality of units each comprising a wrapper-operating tool and means for operating the same, of form block structure, a rotatable cam member controlling said structure, said operating means driven through said cam member, a self-disengaging clutch through which said operating means and said cam member are driven, and a second disengageable clutch through which the driving member of said first named clutch is driven.

22. In a box-covering machine, the combination with a rotatable cam member, of a platen, a support therefor movable in the axis of rotation of said cam member, form block structure controlled by said cam member, and a self-disengaging clutch through which said cam member is driven and whose driving and driven members rotate co-axially with said cam member.

23. In a box-covering machine, a base member, a cam member rotatable about a vertical axis within said base member, pivoted levers carried by said base member above the same, main and auxiliary plungers actuated by said levers, vertically extending rods connected to said levers, cam followers engaging said cam member controlling said rods, and form block structure disposed above said cam member and controlled by said plungers.

24. In a box-covering machine, a base member, a cam member rotatable about a vertical axis within said base member, pivoted levers carried by said base member above the same, main and auxiliary plungers actuated by said levers, vertically extending rods connected to said levers, cam followers engaging said cam member controlling said rods, form block structure disposed above said cam member and controlled by said plungers, and a platen movable axially of said cam member.

25. In a box-covering machine, the combination with form block structure, of a cam member for controlling said structure, and a box ejector controlled by said cam member.

26. In a box-covering machine, the combination with form block structure, of a rod controlling said structure, a cam member actuating said rod, and a box ejector controlled by said rod.

27. In a box-covering machine, the combination with form block structure, of a rod for controlling said structure, a cam member for actuating said rod, a box ejector comprising a box-ejecting plunger, a spring for actuating said plunger, and means actuated by said rod for compressing said spring and releasing said plunger.

28. In a box-covering machine, the combination with form block structure, of a cam member for controlling said structure, a box ejector comprising a box-ejecting plunger, a spring for actuating said plunger, and means for compressing said spring and releasing said plunger actuated and controlled by said cam member.

29. In a box-covering machine, the combination with form block structure, of a cam member for controlling the same, a box ejector comprising a box-ejecting plunger, a spring for actuating said plunger, means for locking said plunger, an operating member causing compression of said spring and release of said plunger, a second member having lost motion with respect to said operating member for actuating the same, and a third member controlled by said cam member for actuating said second member.

30. In a box-covering machine, the combination with form block structure, of a cam member for controlling the same, a box ejector comprising a box-ejecting plunger, a spring for actuating said plunger, means for locking said plunger, an operating member causing compression of said spring and release of said plunger, a second member having lost motion with respect to said operating member for actuating the same, and a third member moved to and fro from said cam member for actuating said second member in opposite directions.

31. In a box-covering machine, a box ejector comprising a longitudinally movable hollow plunger, a spring therein, a second plunger movable in said first named plunger, a box-ejecting plunger movable in said plungers, a latch for locking said box-ejecting plunger and said second plunger to each other, and means for actuating said first named plunger to compress said spring between said first named plunger and said box-ejecting plunger.

32. In a box-covering machine, a box ejector comprising a longitudinally movable hollow plunger, a spring therein, a second plunger movable in said first named plunger, a box-ejecting plunger movable in said plungers, a latch for locking said box-ejecting plunger and said second plunger to each other, means for actuating said first named plunger to compress said spring between said first named plunger and said box-ejecting plunger, and means on said first named plunger for actuating said latch to release said box-ejecting plunger after compression of said spring.

33. In a box-covering machine, a box ejector comprising a longitudinally movable hollow plunger, a spring therein, a second plunger movable in said first named plunger, a box-ejecting plunger movable in said plungers, a latch for locking said box-ejecting plunger and said second plunger to each other, means for moving said first named plunger to compress said spring and thereby move the other plungers, a stop limiting the movement of said second plunger, and means on said first named plunger for actuating said latch to free said box-ejecting plunger to the influence of said spring.

34. In a box-covering machine, a box ejector comprising a longitudinally movable hollow plunger, a spring therein, a second plunger movable in said first named plunger, a box-ejecting plunger movable in said plungers, a latch for locking said box-ejecting plunger and said second plunger to each other, a member for actuating said first named plunger to compress said spring, means on said first named plunger for actuating said latch to free said box-ejecting plunger to the influence of the compressed spring, a second member having lost motion with respect to said operating member for actuating said operating member, and a third member movable to and fro for actuating said second member.

35. In a box-covering machine, a box ejector comprising a longitudinally movable hollow plunger, a spring therein, a second plunger movable in said first named plunger, a box-ejecting plunger movable in said plungers, a latch for locking said box-ejecting plunger and said second plunger to each other, a stop limiting movement of said second plunger with respect to said first named plunger, means for actuating said first named plunger to compress said spring and therethrough moving said second plunger and said box-ejecting plunger, a stop limiting the movement of said second plunger, and means on said first named plunger for actuating said latch to free said box-ejecting plunger to the influence of said spring.

36. In a box-covering machine, the combination with form block structure, of a co-operating platen, a rotatable cam member disposed beneath said structure and platen, and means through which said form block structure is controlled by said cam member.

37. In a box-covering machine, the combination with form block structure, of a co-operating platen, a rotatable cam member disposed beneath said structure and platen, means through which said form block structure is controlled by said cam member, and a support for said platen movable in the axis of rotation of said cam member.

38. In a box-covering machine, the combination with form block structure, of a co-operating platen, a rotatable cam member disposed beneath said structure and platen, means through which said form block structure is controlled by said cam member, a tool-operating unit adjustable with respect to the path of movement of said form block structure and platen and comprising a tool and means for actuating it, and means rotatable as a unit with said cam member for driving said operating means.

39. In a box-covering machine, the combination with form block structure, of a co-operating platen, a rotatable cam member disposed beneath said structure and platen, means through which said form block structure is controlled by said cam member, a tool-operating unit adjustable with respect to the path of movement of said form block structure and platen and comprising a tool and a cam for actuating said tool rotatable always in one direction, and means rotatable as a unit with said cam member for actuating said cam of said unit.

40. In a box-covering machine, the combination with a support, of a unit adjustable to different positions thereon and comprising a tool and a member rotating always in one direction controlling said tool, a cam, form block structure controlled by said cam, and means rotatable with said cam for rotating said rotating member of said unit.

41. In a box-covering machine, the combination with a support, of a unit adjustable to different positions thereon and comprising a tool and a member for actuating it, a cam, form block structure controlled by said cam, a source of power for driving said cam, and means rotated by said source of power in unison with said cam and driven through said cam for driving said tool-actuating member.

42. In a box-covering machine, the combination with a support, of a plurality of units adjustable to different positions thereon and each comprising a tool and a member for actuating said tool, form block structure, a co-operating platen, a cam controlling said form block structure, a support for said platen movable in the axis of rotation of said cam, and means common to the tool-actuating members of said units for actuating them and rotatable with said cam.

43. In a box-covering machine, the combination with a support, of a plurality of units adjustable to different positions thereon and each comprising a tool and a member for actuating said tool, form block structure, a co-operating platen, a cam controlling said form block structure, a support for said platen movable in the axis of rotation of said cam, and means rotatable with said cam and driven through said cam for actuating said tool-actuating members of said units.

44. In a box-covering machine, the combination with a support, of a plurality of units adjustable to different positions thereon and each comprising cam structure rotating always in the same direction and a tool controlled thereby, form block structure, a cam controlling said form block structure, and a common driving member for the cam structures of said units and rotatable co-axially with said cam.

45. In a box-covering machine, the combination with a support, of a plurality of units adjustable to different positions thereon and each comprising cam structure rotating always in the same direction and a tool controlled thereby, form block structure, a cam controlling said form block structure, and a common driving member for the cam structures of said units secured upon said cam.

46. In a box-covering machine, form block structure, a co-operating platen, a cam rotatable about a vertical axis disposed beneath said form block structure and platen, a pivoted lever connected with said form block structure, a second lever pivoted adjacent said cam, a cam follower on said second lever, and a member connecting said levers.

In testimony whereof we have hereunto affixed our signatures this 20th day of June 1923.

THEODORE A. FEDERWITZ.
WALTER T. BAILEY.